D. H. Hickok,
Bolt Cutter.

N°. 52,714. Patented Feb. 20, 1866.

Witnesses:
James T. Graham
Isaac H. How

Inventor
D. H. Hickok
By Thos. P. How
Atty

UNITED STATES PATENT OFFICE.

D. H. HICKOK, OF ROCKFORD, ILLINOIS.

IMPROVEMENT IN SHEARS FOR CUTTING BOLTS.

Specification forming part of Letters Patent No. 52,714, dated February 20, 1866.

*To all whom it may concern:*

Be it known that I, D. H. HICKOK, of Rockford, in the county of Winnebago and State of Illinois, have invented certain new and useful Improvements in Shears for Cutting Bolts; and I do hereby declare that the following is a full and exact description thereof, reference being had to the accompanying drawings, and to the letters of reference marked thereon.

The nature of my invention consists in providing a shoulder on the outer end of each blade of the shears to prevent the bolts slipping from between the blades of the shears when cutting them, and also to prevent the blades of the shears from cutting upon each other; and it also consists in the combination and arrangement of a cam-shaped lever with a link or coupling and the upper jaw of the shears.

Figure 1:
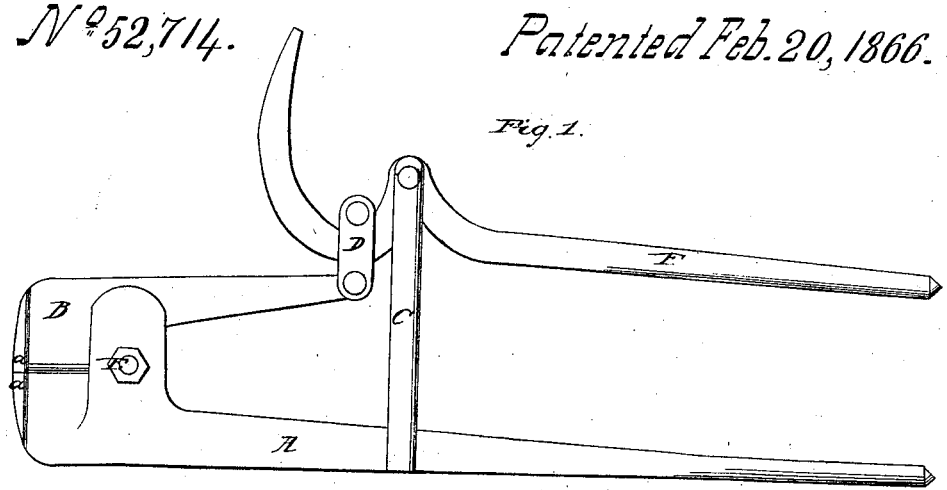
Figure 2:
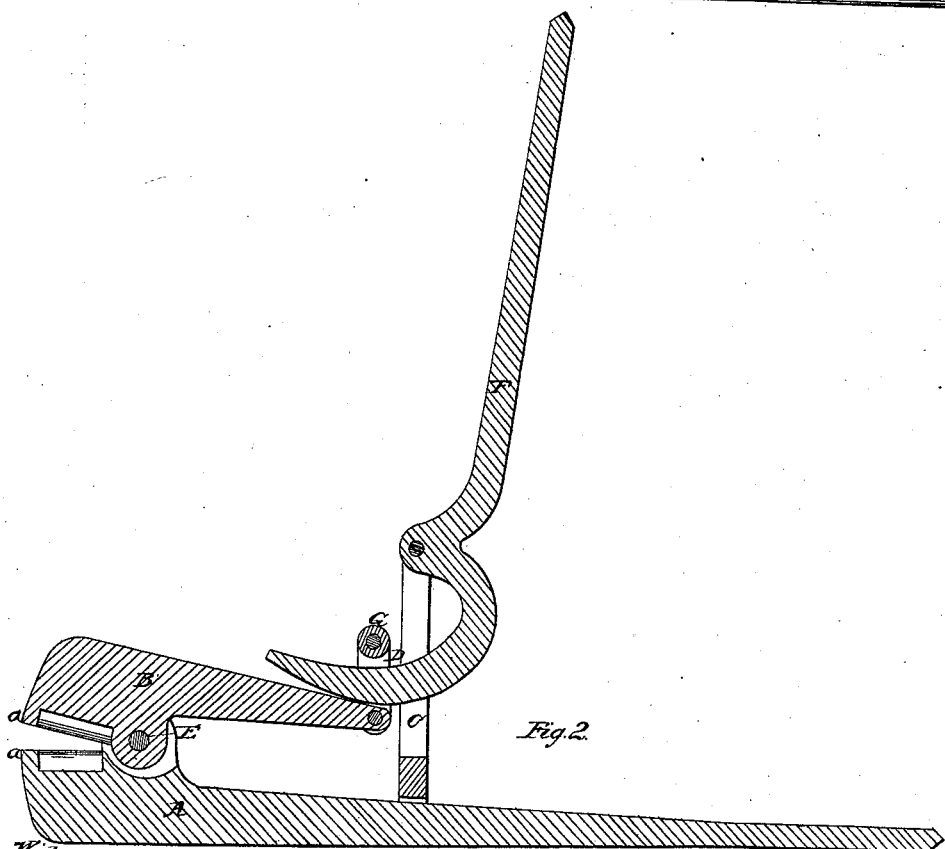

In the drawings, Figure 1 is a side elevation of the shears, showing them closed. Fig. 2 is a longitudinal section through the center of the shears, showing the lever thrown up, which causes the jaws to open.

A is the lower jaw of the shears, from which projects the standard C, to which is attached the lever F, which, in connection with a link or coupling, D, operates the upper jaw, B.

The link or coupling D is attached to the jaw B by a small rivet, which allows it to work freely, and the upper end of the link D is provided with a roller, G.

E is the bolt or rivet by which the jaws A and B of the shears are connected and upon which they work. *a a* are the shoulders at the outer end of the shear-blades, which confine the bolt within the jaws of the shears and prevent the edges of the blades from meeting and cutting upon each other.

I construct my shears with shoulders *a a* on the outer ends of each of the blades A and B, first, for the purpose of preventing the bolts from slipping out of the jaws of the shears while being cut, as they have a natural tendency to slip from between the blades at the outer ends of said blades; but when the blades are first forced against the bolt they crease or cut it a little, and it can then slip no farther than against the shoulders *a a*, and cannot get out until it is cut through, unless the shears are opened, which is done by raising the lever F, which is cam-shaped, and which, as it is raised, depresses the back end of the jaw B and raises the forward end; second, to prevent the edges of the blades from coming in contact with each other, which would soon render them unfit for service.

I also construct a standard, C, on the jaw A, to which I attach, by a small rivet, a cam-shaped lever, F, which works through a cut or slot in the standard C, and connects with the coupling D, in the upper end of which is a small roller, G, which turns with the lever F as it is worked, thereby reducing the friction which would otherwise come on the rivet *e*. The coupling D is attached to the jaw B by a rivet, which allows it to work freely.

It will readily be perceived from the description that I have given of my invention that the handle of the lever F has to be raised considerably to open the jaws of the shears a little.

For some kinds of work these shears may be cast of cast iron or steel and annealed to the proper temper.

Having thus fully described my invention, what I claim is—

The shoulders *a a* on the outer ends of the blades of the shears, for the purposes herein described.

D. H. HICKOK.

Witnesses:
S. F. PENFIELD,
D. B. RITTER,
C. BRIGGS.